W. F. A. STREY.
QUACK GRASS DESTROYER.
APPLICATION FILED AUG. 27, 1918.
1,328,697.
Patented Jan. 20, 1920.
5 SHEETS—SHEET 1.
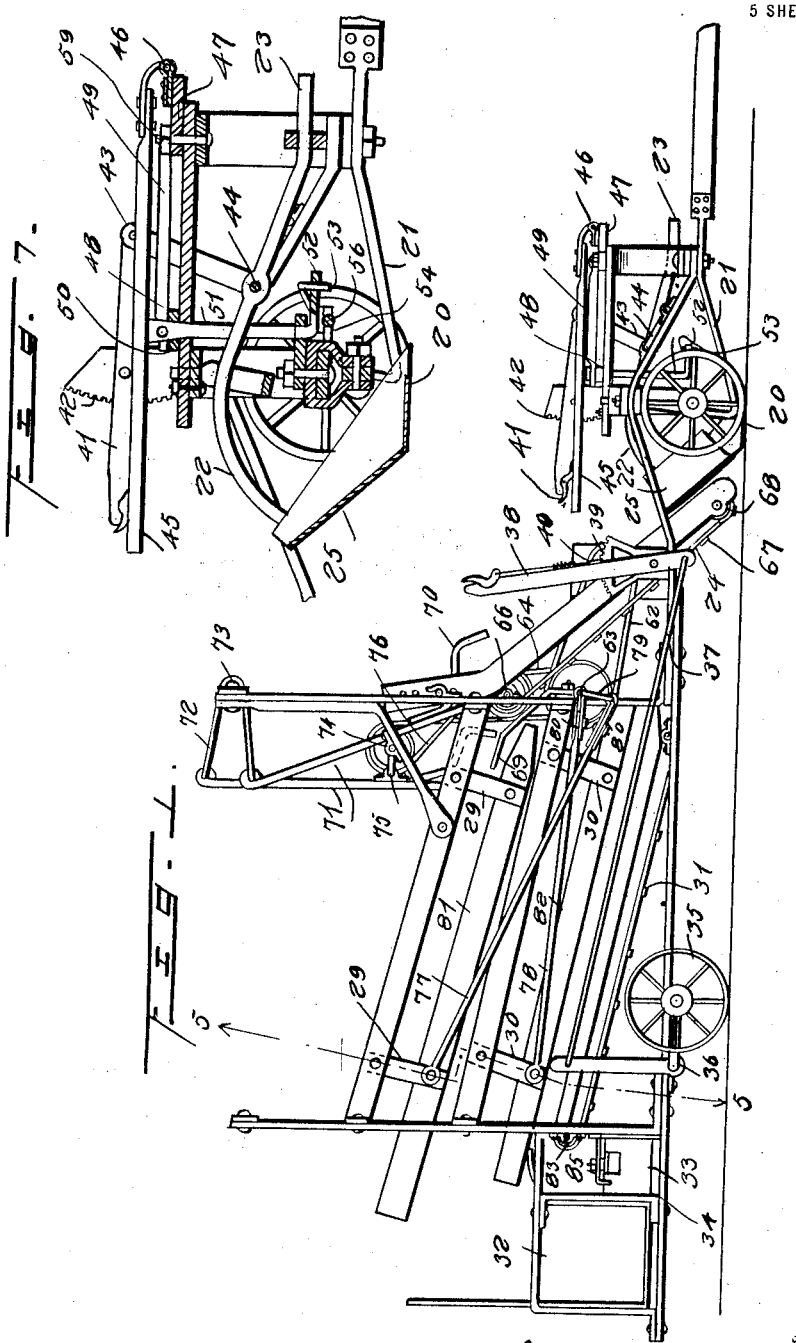
Inventor
W. F. A. STREY.
By
Attorney W. F. A. STREY.
QUACK GRASS DESTROYER.
APPLICATION FILED AUG. 27, 1918.
1,328,697.
Patented Jan. 20, 1920.
5 SHEETS—SHEET 2.
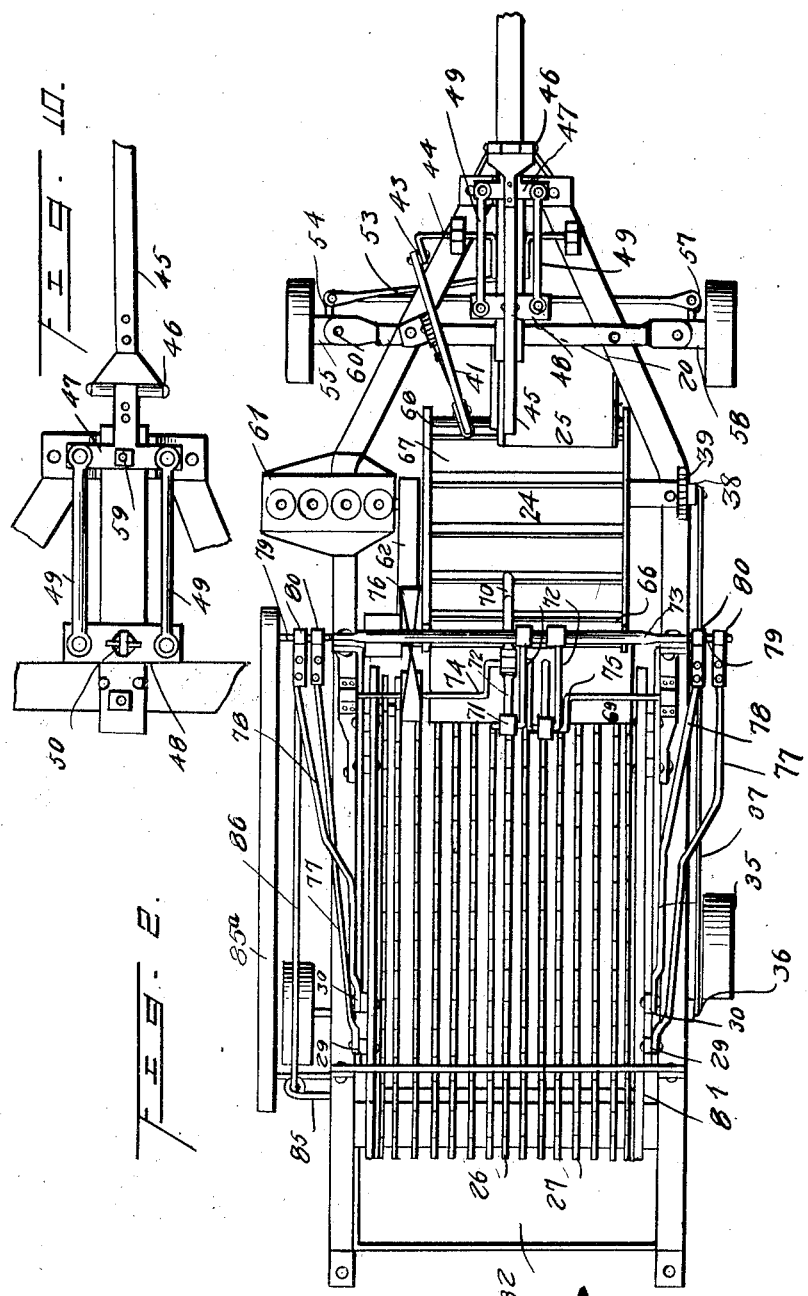

W. F. A. STREY.
QUACK GRASS DESTROYER.
APPLICATION FILED AUG. 27, 1918.
1,328,697.
Patented Jan. 20, 1920.
5 SHEETS—SHEET 3.
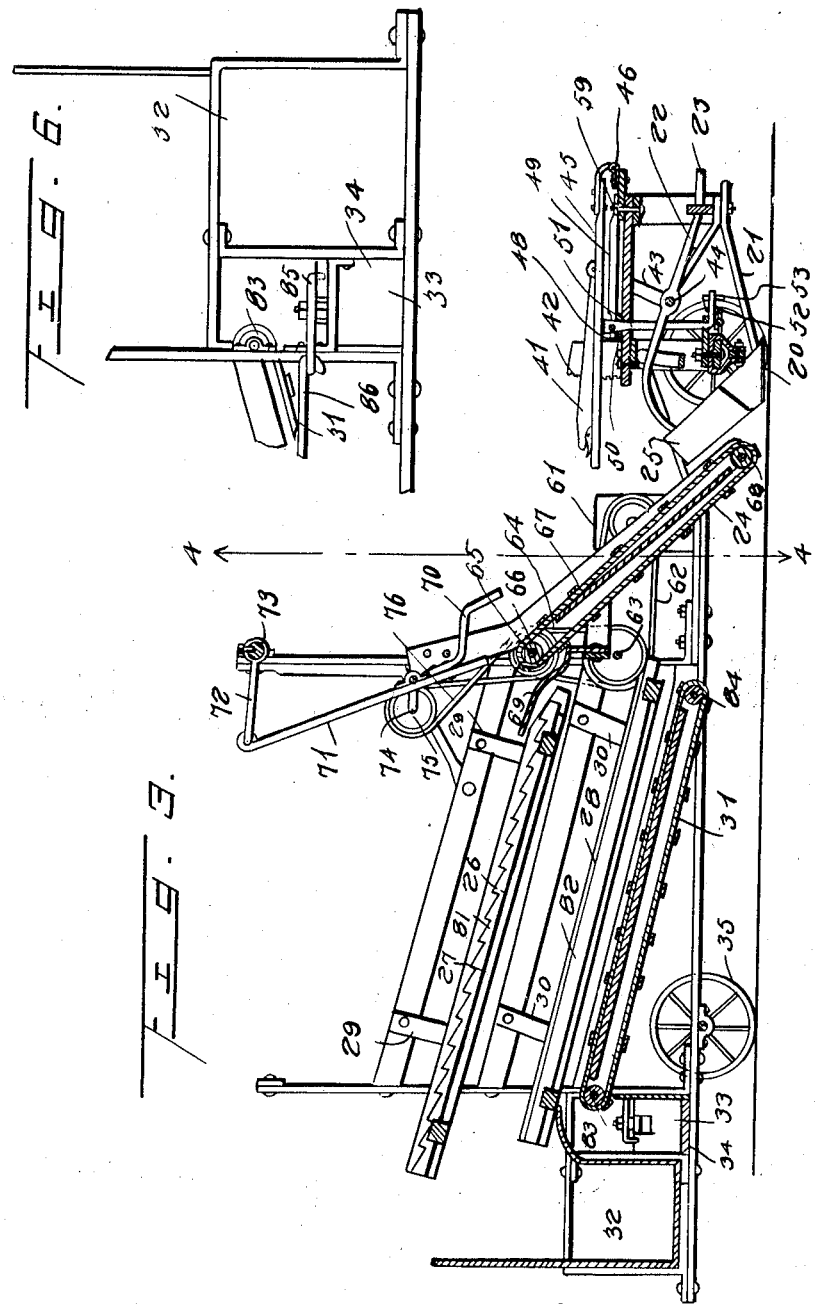
Inventor
W. F. A. STREY.
Attorney

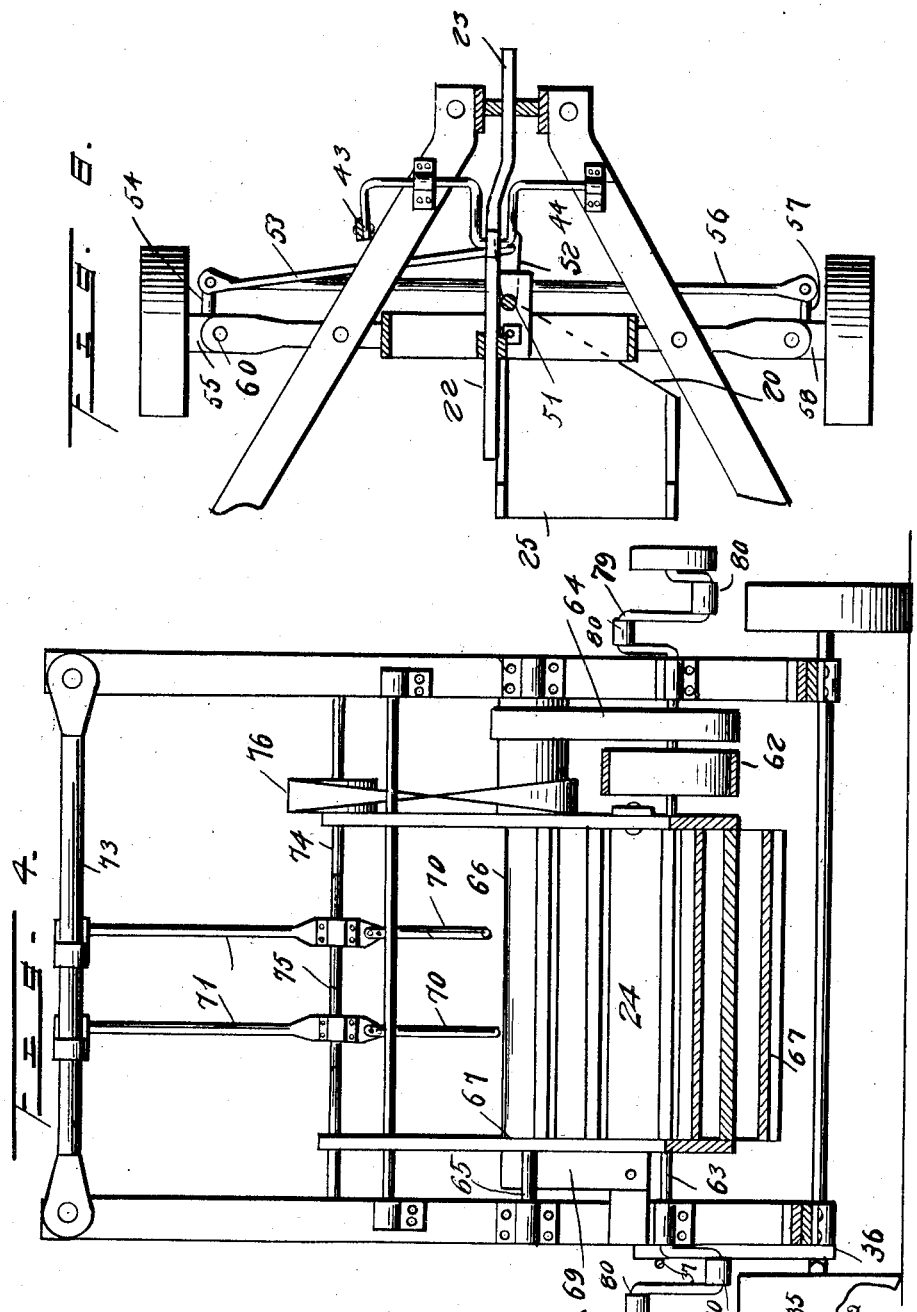

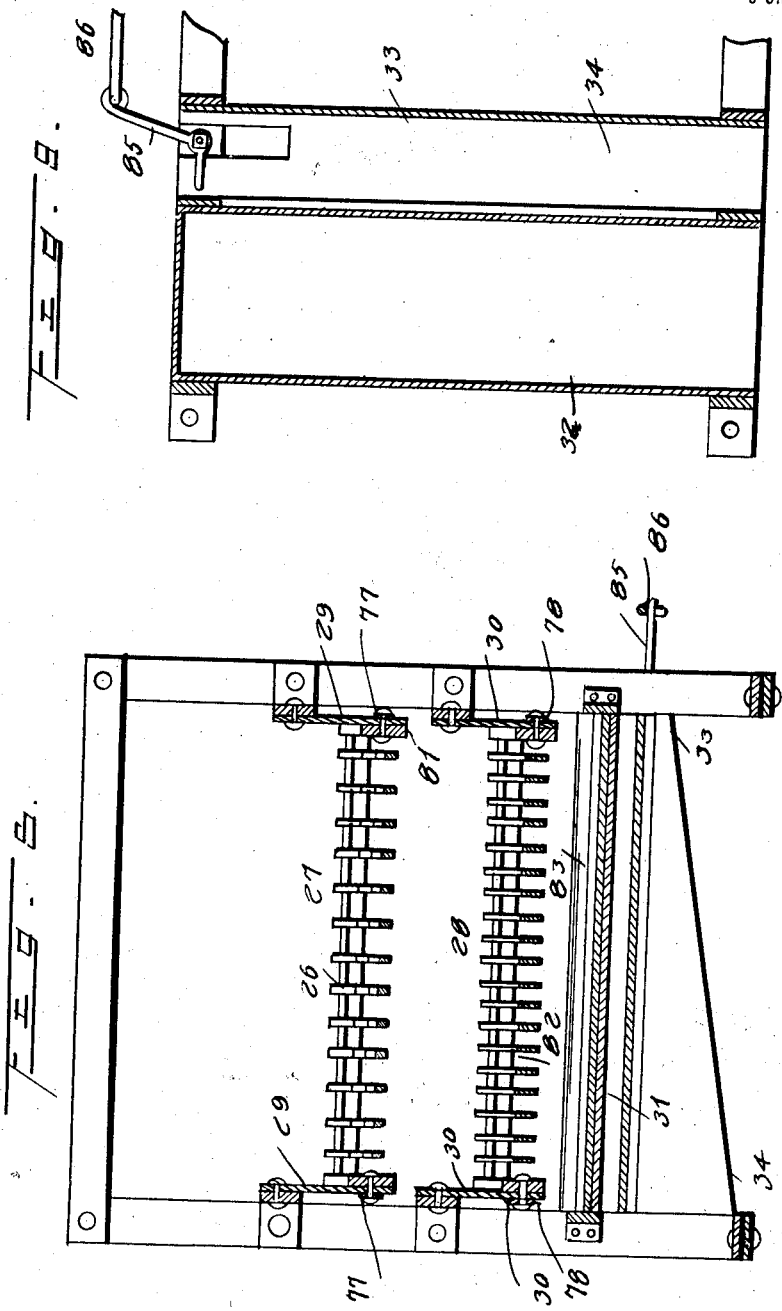

UNITED STATES PATENT OFFICE.

WALTER F. A. STREY, OF NEENAH, WISCONSIN.

QUACK-GRASS DESTROYER.

1,328,697.  Specification of Letters Patent.  Patented Jan. 20, 1920.

Application filed August 27, 1918. Serial No. 251,623.

*To all whom it may concern:*

Be it known that I, WALTER F. A. STREY, a citizen of the United States, residing at Neenah, in the county of Winnebago and State of Wisconsin, have invented certain new and useful Improvements in Quack-Grass Destroyers; and I do hereby declare the following to be a full, clear, and exact description of the invention, such as will enable others skilled in the art to which it appertains to make and use the same.

The object of the invention is to provide a simple and relatively inexpensive and efficient machine for plowing and tearing the dirt from the quack grass, separating the grass in a suitable receptacle and the separated earth in a furrow parallel with the path of the machine under such conditions as to effectually relieve the farmer of the annoyances incident to the growth of this weed which in some portions of the country particularly is of very prolific growth and serves as a means of preventing the proper development of crops, especially in their early stages.

Further objects and advantages will be presented in the course of the following description of a preferred embodiment, it being understood that changes in form, proportion and details may be resorted to within the scope of the appended claims without departing from the spirit of the invention.

In the drawings:

Figure 1 is a side view of the machine.

Fig. 2 is a plan view of the same.

Fig. 3 is a longitudinal sectional view.

Fig. 4 is a front view partly in section on the plane indicated by the line 4—4 of Fig. 3.

Fig. 5 is a vertical sectional view on the plane indicated by the line 5—5 of Fig. 1.

Fig. 6 is a detail end view of the transverse shaker conveyer and quack grass receptacle, to show the means for operating the former.

Fig. 7 is a detail side view of the plow and related parts including the means for adjusting the same.

Fig. 8 is a plan view of the same.

Fig. 9 is a detail horizontal sectional view of the transverse conveyer and quack grass receptacle.

Fig. 10 is a detail plan view of the steering mechanism.

The machine consists essentially of a plow 20 mounted upon a swinging frame 21 of which the beam 22 forms an element for the attachment of a suitable draft device such as a clevis 23, an elevator 24 for receiving the plowed grass and dirt from the plow scoop 25, a riddle 26 which receives the material from the elevator and consists of upper and lower reciprocatory members 27 and 28 having suitable hangers 29 and 30, an endless apron 31 disposed beneath the riddle members to receive the dirt detached from the roots of the quack grass, a quack grass receptacle 32 into which the riddle members discharge, and from which the grass may be removed at intervals to suit the convenience of the operator, and a dirt or earth receptacle 33 having a transverse shaker conveyer 34 to receive the material discharged from the apron 31 and conduct it laterally to discharge it into a furrow parallel with the path of the machine.

As it is desirable to have the machine maintain a substantially horizontal position and at the same time to have the right hand wheel 35 operate in the furrow into which the transverse conveyer discharges, the said wheel is preferably mounted for adjustment as by means of a bell crank bracket 36 connected by a rod 37 with a hand lever 38 located near the front of the machine and operating with reference to a toothed segment 39 with which engages a pawl 40.

Also it is desirable to provide for the vertical adjustment of the plow so that a shallow or deep operation thereof may be secured, and to this end the supporting frame 21 thereof is mounted suitably for vertical swinging movement controlled by a hand lever 41 operating with reference to a toothed segment 42 and connected by a link 43 with the beam element 22. In the construction illustrated, the link 43 is connected with a crank shaft 44, which in turn is connected with the beam 22 so that the vertical adjustment of the plow to secure the required depth of operation may be secured without interfering with the directness of the draft as conveyed thereto from the beam.

Also the tongue 45, which is preferably hinged as at 46, is connected with the guiding mechanism consisting of pivotal crossheads 47 and 48 connected by links 49, the rear crosshead being engaged by a seat 50 with the upper cross sectionally irregular end of a spindle 51 having a crank arm 52 connected by a rod 53 with an arm 54 on one of the front or steering wheel spindles 55 which in turn is connected by a rod 56 with a crank arm 57 on the spindle 58 of the other steering wheel. The tongue is capable of lateral swinging movement upon the pivot 59 of the forward crosshead 47, and this motion is communicated through the means above described to the steering wheels of which the spindles are pivoted to the draft frame as shown at 60.

The means suggested and shown in the drawings for operating the various elements of the mechanism employed for conveying and destroying the quack grass consists of an engine 61 belted or otherwise connected as shown at 62 to a main drive shaft 63 from which motion is conveyed through a belt 64 or the equivalent thereof to shaft 65 which carries the drum or roller 66 at the upper end of the elevator 24 which includes a belt 67 and a lower roller 68 and is designed, as above noted, to receive the material from the plow and conduct it to and discharge it upon the upper member 27 of the riddle.

At the point of discharge of the elevator upon the riddle or the upper member of the latter there is arranged a tearing mechanism consisting, for example, of a plate 69 and coöperating forks 70 of which the stems 71 are mounted at their upper ends upon swinging arms 72 supported by a cross bar 73 of the frame, intermediate portions of said fork stems being connected with the offsets or crank 74 of a crank shaft 75 which may receive its motion by means of a belt 76 from the transverse shaft 66, said belt being shown crossed in order that the proper direction of motion may be imparted to the forks to engage the material as it is brought to the upper end of the elevator and drag it toward the riddle, the forks operating alternately so as to have a tearing action with reference to the grass to serve as a means of destroying it and at the same time separating from the roots thereof the earth which has been carried thereby to this point.

As above noted, the riddle preferably consists of upper and lower members of which the frames are connected by rods or pitmen 77 and 78 with angularly and preferably oppositely disposed cranks 79 and 80 on the outer ends of the drive shaft 63. Each riddle member in addition to its frame consists of a plurality of parallel longitudinal riddle bars or elements 81 and 82 which are toothed on their upper edges to produce a tearing action upon the grass as it passes thereover and also to serve as a means of advancing the same gradually toward the rear of the machine, said members preferably being inclined upwardly toward their rear ends and the said bars or elements being spaced apart or arranged at intervals transversely, the spaces between the bars or elements of the lower riddle member being smaller or narrower than those of the upper riddle member, so that loosened earth may drop through the riddle members but any small particles or portions of the weeds which may pass between the bars or elements of the upper member may not also pass through the lower member and thus be deposited upon the apron 31 which is designed to catch the loosened earth dropping from the riddle members and convey it as hereinbefore noted to the transverse conveyer 34. Any suitable means may be employed for actuating the apron 31 which is provided with upper and lower carrying rollers 83 and 84, such as a belt $85^a$ extending from the drive shaft 63. The transverse conveyer 34 consists of a plate inclined downwardly toward its discharge end and mounted for reciprocatory movement in the receptacle 33, a bell crank lever 85 being connected with said plate and in turn by means of a rod 86 with a crank arm of the drive shaft.

It will be noted that the riddle members are disposed to discharge into the quack grass receptacle 32 at the rear end of the machine where the grass is retained until removed at the convenience of the operator, while the earth which has been detached from the roots and received by the apron 31 is conducted laterally by the transverse conveyer 34 and deposited in the furrow in rear of the wheel 35 which, as above noted, is designed to follow the furrow at the side of and parallel with the path of the machine.

Thus the machine not only effectually raises and removes from the soil the quack grass with the roots but conveys it to a point where a tearing action is produced to separate the tangled masses thereof and to some extent separate the earth from the roots, after which the material is thoroughly shaken to detach the remaining portion of soil which drops through the riddle members to the apron by which it is conveyed to a point where it can be restored to the ground while the weeds with their roots, in a more or less torn, broken and injured condition are deposited in a receptacle from which they may be withdrawn and dried and burned or otherwise rendered innocuous and it will be understood moreover that the entire operation in all of its several steps is conducted without special attention upon the part of the operator other than to guide the machine and regulate the depth of the plow and maintain a substantially horizontal position of the rear portion of the frame so that the operation of the transverse dirt discharging conveyer may be effective.

Moreover, it will be understood that any desired number of forks or equivalent members of the tearing mechanism which serves to remove the grass from the elevator to the riddle members may be employed to secure the result described with the maximum efficiency.

Having described the invention, I claim:

1. A quack grass destroyer having a plow, a reciprocatory longitudinally barred riddle of which the elements are spaced to provide intervals, means for conveying the quack grass from the plow to said riddle, an apron located beneath the riddle for receiving dirt detached from the quack grass roots and independent receptacles for said quack grass and dirt.

2. A quack grass destroyer having a plow, a riddle consisting of upper and lower reciprocatory members provided with longitudinal toothed bars spaced transversely, means for conveying material from the plow to said riddle, an apron disposed below the lower riddle member for receiving dirt dropped from the roots of the grass, and independent receptacles for the quack grass and dirt.

3. A quack grass destroyer having a plow, a riddle consisting of upper and lower reciprocatory members longitudinally barred and toothed, with the intervals between adjacent bars of the lower member of less width than those of the upper member, means for conveying material from the plow to the upper member of the riddle, an apron disposed beneath the lower riddle member for receiving dirt detached from the quack grass roots, and independent receptacles for receiving quack grass and dirt respectively from said riddle members and the apron.

4. A quack grass destroyer having a plow, a riddle consisting of upper and lower members inclined upwardly toward their discharge ends and consisting respectively of longitudinal toothed bars spaced apart to form intervals for the escape of dirt detached from the roots of the quack grass, the spaces between the bars of the lower riddle member being smaller than those of the upper riddle member, means for conveying material from the plow to the upper riddle member, an apron for retaining dirt falling through the lower riddle member, and independent receptacles for receiving the discharge respectively from said riddle member and the apron.

5. A quack grass destroyer having a plow, a reciprocatory riddle, means for conveying material from the plow to said riddle, a conveyer apron located beneath the riddle for retaining dirt detached from the roots of the quack grass, independent receptacles for the quack grass and dirt discharged respectively by the riddle and said conveyer apron, and a transverse conveyer located in the receptacle for the discharge from said apron, to conduct the same to the side of the path of the machine.

6. A quack grass destroyer having a plow, a reciprocatory riddle, means for conveying material from the plow to the riddle, a conveyer apron located beneath the riddle to receive dirt detached from the quack grass roots, and a transverse reciprocatory conveyer for receiving the discharge from said conveyer apron and conducting the same to a point at one side of the path of the machine.

In testimony whereof I affix my signature in presence of two witnesses.

WALTER F. A. STREY.

Witnesses:
  S. D. BAIRD,
  GEO. G. BARLOW.